United States Patent
Kirkland

(10) Patent No.: US 7,513,758 B2
(45) Date of Patent: Apr. 7, 2009

(54) SEALING RINGS FOR ABRASIVE SLURRY PUMPS

(75) Inventor: Alan Kirkland, Crystal City, MO (US)

(73) Assignee: Good Earth Tools, Inc., Crystal City, MO (US)

(*) Notice: Subject to any disclaimer, the term of this patent is extended or adjusted under 35 U.S.C. 154(b) by 211 days.

(21) Appl. No.: 11/594,615

(22) Filed: Nov. 8, 2006

(65) Prior Publication Data

US 2007/0246897 A1    Oct. 25, 2007

Related U.S. Application Data

(60) Provisional application No. 60/734,487, filed on Nov. 8, 2005.

(51) Int. Cl.
*F04B 39/10* (2006.01)
*F04B 53/10* (2006.01)

(52) U.S. Cl. .................. 417/532; 417/521; 417/531; 417/900

(58) Field of Classification Search ................ 277/652, 277/653, 654; 137/874; 251/359; 417/531, 417/532, 900
See application file for complete search history.

(56) References Cited

U.S. PATENT DOCUMENTS

| | | | |
|---|---|---|---|
| 3,594,011 A | 7/1971 | Haller |
| 3,666,456 A | 5/1972 | Haller |
| 3,976,092 A | 8/1976 | Coja et al. |
| 4,019,839 A | 4/1977 | Schwing |
| 4,057,373 A | 11/1977 | Schwing |
| 4,087,209 A | 5/1978 | Mahig et al. |
| 4,169,637 A | 10/1979 | Voitas |
| 4,178,142 A | 12/1979 | Schwing |
| 4,191,513 A | 3/1980 | Schwing |
| 4,198,193 A | 4/1980 | Westerlund et al. |
| 4,241,483 A | 12/1980 | Voitas |
| 4,260,338 A | 4/1981 | Haas |
| 4,343,598 A | 8/1982 | Schwing et al. |
| 4,373,875 A | 2/1983 | Schwing |
| 4,437,817 A | 3/1984 | Metzelder |
| 4,465,441 A | 8/1984 | Schwing |
| 4,472,118 A | 9/1984 | Schwing |
| 4,556,370 A | 12/1985 | Schwing |
| 4,614,483 A | 9/1986 | Hudelmaier |
| 4,681,022 A | 7/1987 | Schwing |
| RE32,657 E | 4/1988 | Schwing |
| 4,852,467 A | 8/1989 | Schwing |
| 4,893,992 A | 1/1990 | Schlecht |
| 4,966,789 A | 10/1990 | Knapp et al. |
| 4,978,487 A | 12/1990 | Eiffler et al. |
| 4,979,884 A | 12/1990 | Letarte et al. |
| 5,066,203 A | 11/1991 | Coja et al. |
| 5,127,429 A | 7/1992 | Kempf et al. |

(Continued)

*Primary Examiner*—Devon C Kramer
*Assistant Examiner*—Philip Stimpert
(74) *Attorney, Agent, or Firm*—Storm LLP; Paul V. Storm; John J. Patti

(57) ABSTRACT

There are a number of applications today where the pumping of abrasive slurries is necessary. The pumping mechanisms, though, can be complex, employing multiple transfer cylinders and movable pipes. These designs have their problems, specifically wear between poorly sealing surfaces. To reduce this problem, seals are provided that have multiple wear surfaces which include harder tiles secured over a softer core to benefit from the relative hardness or flexibility of each of the respective materials.

9 Claims, 4 Drawing Sheets

U.S. PATENT DOCUMENTS

| | | | |
|---|---|---|---|
| 5,180,294 A | 1/1993 | Watchorn | |
| 5,263,828 A | 11/1993 | Schwing et al. | |
| 5,281,113 A | 1/1994 | Simnovec | |
| 5,316,453 A | 5/1994 | Schwing | |
| 5,360,321 A | 11/1994 | Benckert et al. | |
| 5,380,174 A | 1/1995 | Schwing | |
| 5,580,166 A | 12/1996 | Schmittchen et al. | |
| 5,839,883 A | 11/1998 | Schmidt et al. | |
| 6,171,075 B1 | 1/2001 | Munzenmaier et al. | |
| 6,206,662 B1 | 3/2001 | Schwing | |
| 6,267,571 B1 | 7/2001 | Anderson et al. | |
| 6,338,615 B1 | 1/2002 | Hurr et al. | |
| 6,422,840 B2 | 7/2002 | Anderson et al. | |
| 6,450,779 B1 | 9/2002 | Schwing | |
| 6,484,752 B1 | 11/2002 | Ebinger et al. | |
| 6,793,467 B2 | 9/2004 | Hudelmaier | |
| 6,857,861 B2 | 2/2005 | Condon et al. | |
| 6,929,454 B2 | 8/2005 | Munzenmaier et al. | |
| 7,048,006 B2 | 5/2006 | Hurr | |
| 2003/0180142 A1 | 9/2003 | Onoda et al. | |
| 2003/0215344 A1* | 11/2003 | Condon et al. | 417/518 |
| 2005/0249030 A1* | 11/2005 | Williams | 366/79 |

* cited by examiner

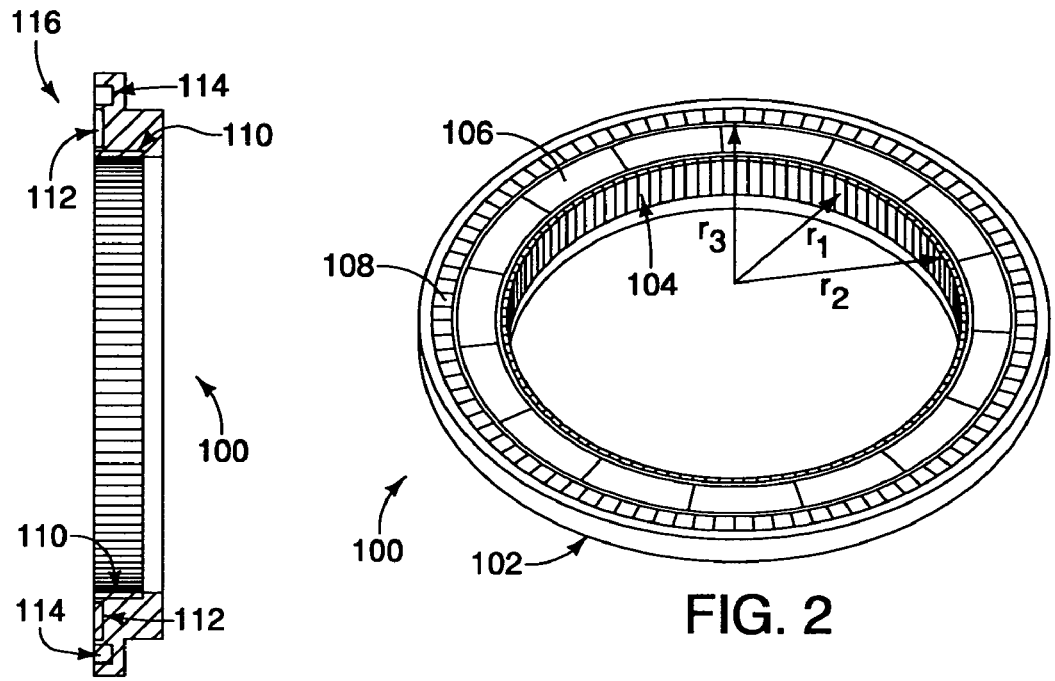
FIG. 4
FIG. 2
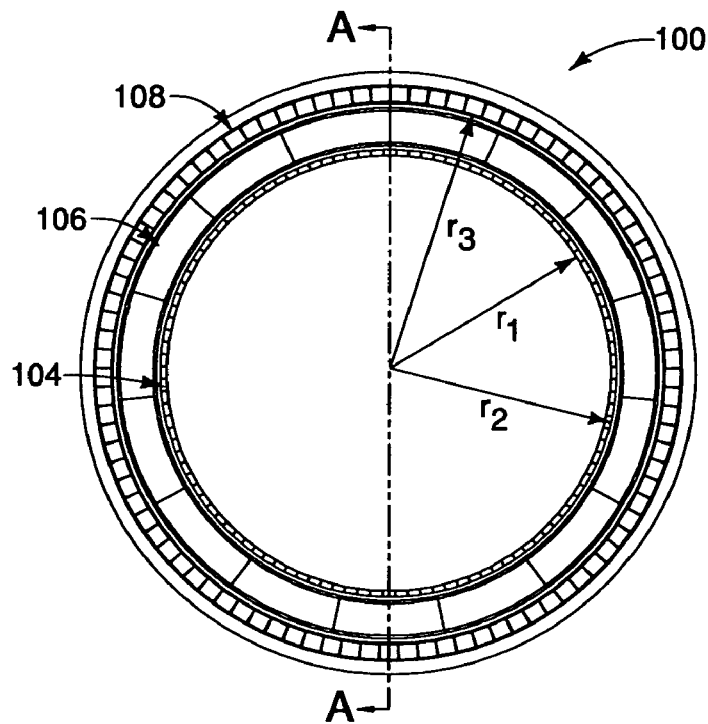
FIG. 3

SEALING RINGS FOR ABRASIVE SLURRY PUMPS

CLAIM OF PRIORITY

This application claims priority from U.S. Provisional Patent Application No. 60/734,487 entitled "SEALING RINGS FOR ABRASIVE SLURRY PUMPS" filed on behalf of Alan Kirkland, on Nov. 8, 2005, which is incorporated herein by reference for all purposes.

TECHNICAL FIELD

The invention relates generally to a wear ring and, more particularly, to a wear ring for use in pumping viscous and abrasive fluids, namely cement slurries.

BACKGROUND

In concrete pumping applications, a common feature is the use of a multi-cylinder pump. A hydraulic actuator alternates piping between different cylinders. This configuration, though, does not lend itself to utilizing particular fittings that tightly seal the cylinders to the sections of piping. Moreover, it is well known that abrasive slurries are notorious for excessively wearing piping, fittings, and seals. Hence, when loose fitting seals, as with multi-cylinder pumps, are employed, the likelihood of both wear and failure dramatically increases because of the increased number of wearing surfaces.

One conventional solution is to employ a generally uniform hard seal or ring. The seal can be made of a variety of hard materials, such as tungsten carbide. Hard material can withstand a substantial amount of abuse from abrasive slurries. However, the hardness of the material generally results in a brittle material, one that is subject to fracture. Fractures can cause the seal to fail. Therefore, hard materials lack the inherent flexibility of softer materials, but are better equipped to withstand abrasion than softer materials.

Oftentimes, however, as a hydraulic actuator alternates piping between the different cylinders, the abrasive slurry is sheared. Typically, the shearing of the abrasive slurry, like concrete, causes stones and other abrasive components contained in the abrasive slurry to be sheared as well. Thus, by shearing the abrasive slurry, it is not uncommon to fracture very hard materials that provide seals between the sections of piping. However, if the hard materials are replaced with a softer material to avoid fracturing, then the good sealing properties of the harder materials can be lost.

Therefore, there is a need for a method and/or apparatus for efficiently sealing abutted pipes in abrasive and viscous fluid pumping applications that provides both a good seal and the ability to withstand the shearing of abrasive slurries.

SUMMARY OF THE INVENTION

The present invention, accordingly, provides a pipe seal for an abrasive materials pump. A core base ring is formed of a first material selected for strength and fracture toughness. Specifically, the core base ring has at least one aperture, a front side, and a rear side. A plurality of tiles of a first size, formed of a second material, are arranged along an inner surface of the at least one aperture. Also, a plurality of tiles of a second size, formed of a third material, are arranged along the perimeter of the aperture on at least the front side. Additionally, a plurality of tiles of additional sizes, formed of a fourth material, are arranged along at least a portion of the remainder of the front side. Moreover, the fourth material is harder than the first material, and the second material is harder than the fourth material. The third material is also harder than the second material.

In an alternative embodiment of the present invention, an improved pump assembly for moving abrasive slurries is also provided. A pair of slurry conduits are provided where each conduit has a circular opening. A transfer conduit is also provided where the transfer conduit has a circular opening. The opening of the transfer conduit is also movable between the openings of each of the pair of conduits to establish fluid communication between one of the slurry conduits and the transfer conduit. A seal ring associated with at least one of the openings in the slurry and transfer conduits is also included. This seal ring comprises a core base ring, a plurality of tiles of a first size, a plurality of tiles of a second size, and a plurality of tiles of additional sizes. The core base ring is formed of a first material selected for strength and fracture toughness. Specifically, the core base ring has at least one aperture, a front side, and a rear side. A plurality of tiles of a first size, formed of a second material, are arranged along an inner surface of the at least one aperture. Also, a plurality of files of a second size, formed of a third material, are arranged along the perimeter of the aperture on at least the front side. Additionally, a plurality of files of additional sizes, formed of a fourth material, are arranged along at least a portion of the remainder of the front side. Moreover, the fourth material is harder than the first material, and the second material is harder than the fourth material. The third material is also harder than the second material.

In yet another alternative embodiment of the present invention, a seal for an abrasive slurry pump assembly is provided. There is a core base plate formed of a first material selected for strength and fracture toughness having a front side and a rear side, said core plate having two or more ring shaped apertures of at least one selected inner diameter therein which extend from said front side to said rear side. Additionally, there is a plurality of first tiles formed of a second material arranged around each inner diameter of each of said ring shaped apertures, and there is a plurality of second tiles formed of a third material arranged to at least partially covering the front side. The third material is also harder than the first material, while the third material is harder than the second material.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 is an isometric view of a wear ring of FIG. 1;

FIG. 3 is a front view of the wear ring of FIG. 1;

FIG. 4 is a side view of the wear ring of FIG. 1;

DETAILED DESCRIPTION

Figure 1:
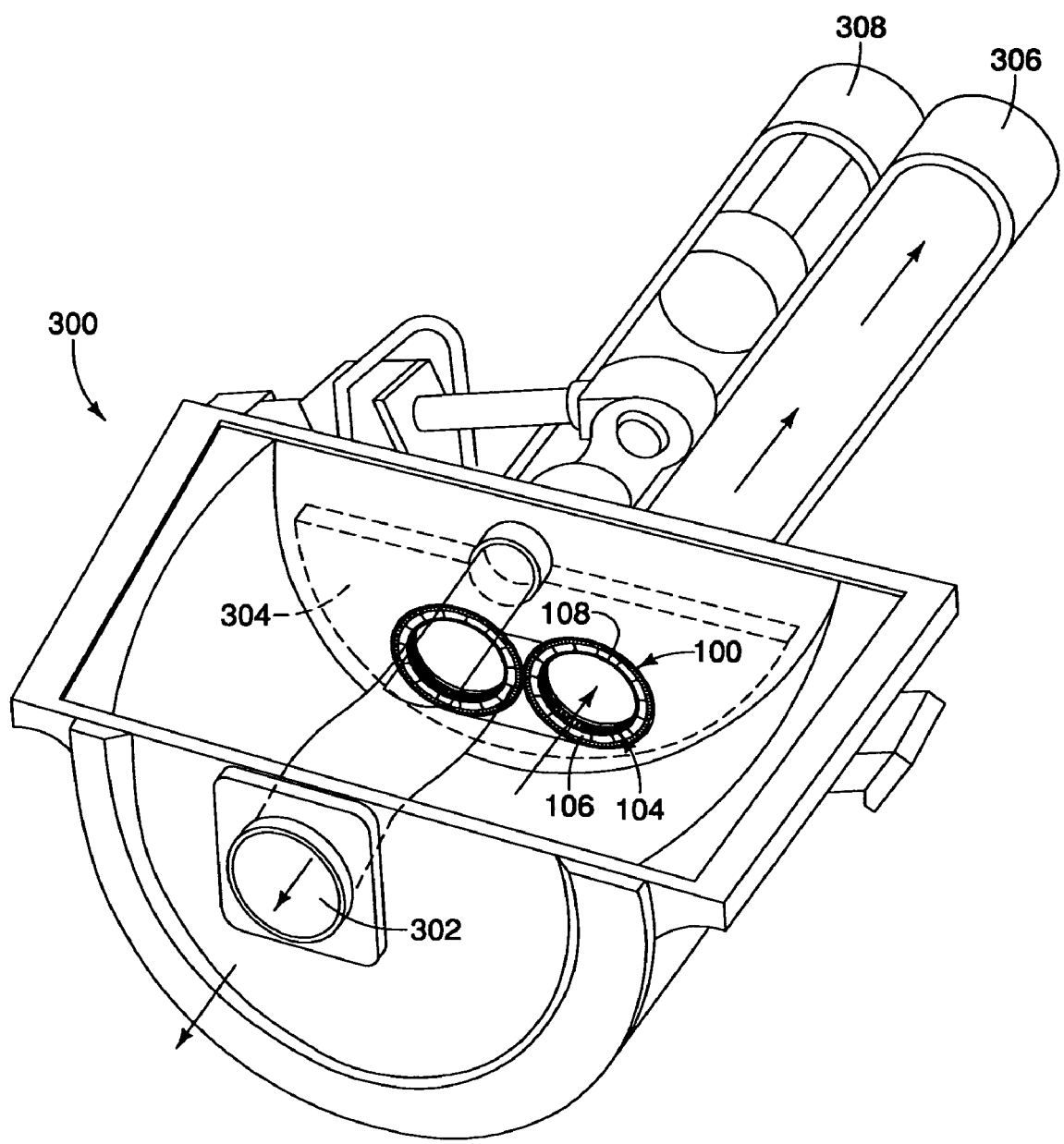
FIG. 1 is an isometric view of a multi-cylinder abrasive slurry pump utilizing wear rings in accordance with a preferred embodiment of the present invention.

Refer now to the drawings wherein depicted elements are, for the sake of clarity, not necessarily shown to scale and wherein like or similar elements are designated by the same reference numeral through the several views.

A multi-cylinder concrete pump is the application for the wear ring 100 of the present invention, as required by the operation of the pump. As can be seen in FIG. 1, a multi-cylinder pump 300 employs two wear rings 100, which are in accordance with a preferred embodiment of the present invention.

Specifically, the pump 300 includes a pivot pipe 302 and a cylinder plate 304. The cylinder plate 304 enables the pivot pipe 302 to move between supply pipes 306 and 308. However, because of the problems associated with abrasion resulting from fluid contact with the concrete or other abrasive slurry, wear rings 100 are included on the face of the cylinder plate 304 and the pivot pipe 302. In other words, the inner face tiles 106 and the outer face tiles 108 of the wear rings 100 of cylinder plate 304 and of the pivot pipe 302 face one another. Thus, a hard wear surface is provided where there is a poor seal between the pivot pipe 302 and supply pipes 306 and 308.

Referring to FIGS. 2-4 of the drawings, the reference numeral 100 generally designates a wear ring embodying features of the present invention. The wear ring 100 comprises a core base ring 102, circumferential tiles 104, inner face tiles 106, and outer face tiles 108.

Generally, the wear ring 100 is formed to operate as a seal between two connecting pipes, one of which is movable relative to the other. Because the openings of the pipes slide past one another, there is considerable opportunity for abrasive wear. Specifically, the main wearing surface is located along the inner radius $r_1$ of the wear ring 100, where continuous fluid contact with the abrasive slurry, such as concrete, occurs. However, because of the design, the front face 116 is also a surface that endures a substantial amount of wear.

Underlying the wear ring 100 is the core base ring 102. The core base ring 102 usually forms the majority of the volume of wear ring 100. Typically, the core base ring 102 is formed of a relatively soft material, such as steel, that includes an inherent flexibility, strength, and ductility. Specifically, a material used for the core base ring 102 is chosen based on its fracture toughness, which is typically greater than 30 MPa-m$^{1/2}$ at standard temperature and pressure. Additionally, the hardness of the material of the core base ring 102 is about HRC 20 to about HRC 40.

Formed within the core base ring 102 are a number of grooves. An annular groove 110 is formed along the inner radius $r_1$ at nearly the depth of the core base ring 102. A first surface groove 112 is also formed on the front face 116 of the core base ring 102 beginning at a radius $r_2$, and a second surface groove 114 is formed on the front face 116 beginning at a radius $r_3$. Relative to one another, the first surface groove 112 is radially wider and shallower than the second surface groove 114.

First surface groove 112 and second surface groove 114 are employed to house hard tiles. In particular, inner face tiles 106 are placed within the first surface groove 112, and the outer face tiles 108 are placed within the second groove 114. The inner face tiles 106 and the outer face tiles 108, too, are made of a material that is harder than the material comprising the core base ring 102. Typically, tungsten carbide, tantalum carbide, as well as other hard metals, carbides, and ceramics are employed to form the circumferential tiles 104. Due to the increased hardness, there is also less emphasis on a need for a material with a relatively high fracture toughness. In fact, a material employed for the tiles can be chosen to have a fracture toughness of less than 10 MPa-m$^{1/2}$. Moreover, the inner face tiles 106 and the outer face tiles 108 are typically secured into place by gluing, brazing, soldering, or welding. Therefore, a good sealing surface is provided by the inner face tiles 106 and the outer face tiles 108 due to their particular hardnesses. The inner face tiles 106 can also be arranged to extend to the aperture. Typically, the hardness of the inner face tiles 106 is about HRA 80 to about HRA 95. Additionally, the hardness of the outer face tiles 108 is about HRA 70 to about HRA 90.

Located within the annular groove 110 are a plurality of circumferential files 104. The circumferential tiles 104 are longitudinally arranged around inner radius $r_1$. In other words, the circumferential files 104 are arranged such that the longest dimension of each generally rectangular file is orthogonal to inner radius $r_1$ to provide a substantially continuous wear surface. Typically, too, the circumferential files 104 can be arranged to extend to the front face 116 in order to cover the edges of the inner face tiles 106. These circumferential tiles 104 are made of a material that is harder than the material comprising the core base ring 102. Typically, tungsten carbide, tantalum carbide, as well as other hard metals, carbides, and ceramics are employed to form the circumferential tiles 104. Due to the increased hardness, there is less emphasis on a need for a material with a relatively high fracture toughness. In fact, a material employed for the files can be chosen to have a fracture toughness of less than 10 MPa-m$^{1/2}$, and the hardness of the circumferential tiles 104 is typically between about HRA 70 and HRA 90. Moreover, the circumferential tiles 104 are typically secured into place by gluing, brazing, soldering, or welding.

Specifically, in arranging tiles of varying hardnesses, there are several configurations that can be employed. For example, in one configuration, the materials of the core base ring 102, of the outer face files 108, of the circumferential files 104 and of the inner face tiles 106 have hardnesses that are about HRC 30, about HRA 83, about HRA 86, and about HRA 90, respectively. In an alternative example, the materials of the core base ring 102 and of the inner face tiles 106 have hardnesses that are about HRC 30 and about HRA 90, respectively, while the outer face files 108 and the circumferential tiles 104 have hardnesses of about HRA 84.

The combination of employing a softer and more elastic inner core surrounded by a number of harder files allows for a very wear resistant sealing ring. The use of covering tiles with varying hardnesses relative to one another provides an abrasion-resistant surface that can resist abuse sustained by fluid contact with and shearing of abrasive slurries, such as concrete, that would otherwise cause other seals to wear more quickly or fracture more often. To reduce fracturing, the harder files "float" on the softer inner base core ring 102. This ability to "float" means that impacts that result in use will not necessarily fracture the hard tiles. Additionally, the circumferential tiles 104 and the outer face tiles 108 are softer relative to the inner face tiles 106. The inner face tiles 106 are comprised of a very hard material sufficient to resist abrasion, but has a higher likelihood of fracture when shearing forces are applied. The circumferential tiles 104 and the outer face tiles 108, themselves, are less effective at providing a seal than the inner face tiles 106, but are of sufficient softness to better resist fracturing that results from shearing abrasive slurries. Thus, circumferential tiles 104 and the outer face tiles 108 protect the inner face tiles 106.

Therefore, the wear ring 100 provides several benefits over prior-art designs. In particular, the wear ring 100 takes advantage of the hardness of tiles while also taking advantage of the flexibility of softer materials. Moreover, by utilizing tiles instead of an entire wear ring comprised of harder material, tiles can be individually replaced if, and when, fracture of particular tiles occurs. Hence, it is possible to refit the wear ring 100 several times during its lifetime, which reduces the overall cost to the user of the wear ring 100.

Figure 5:
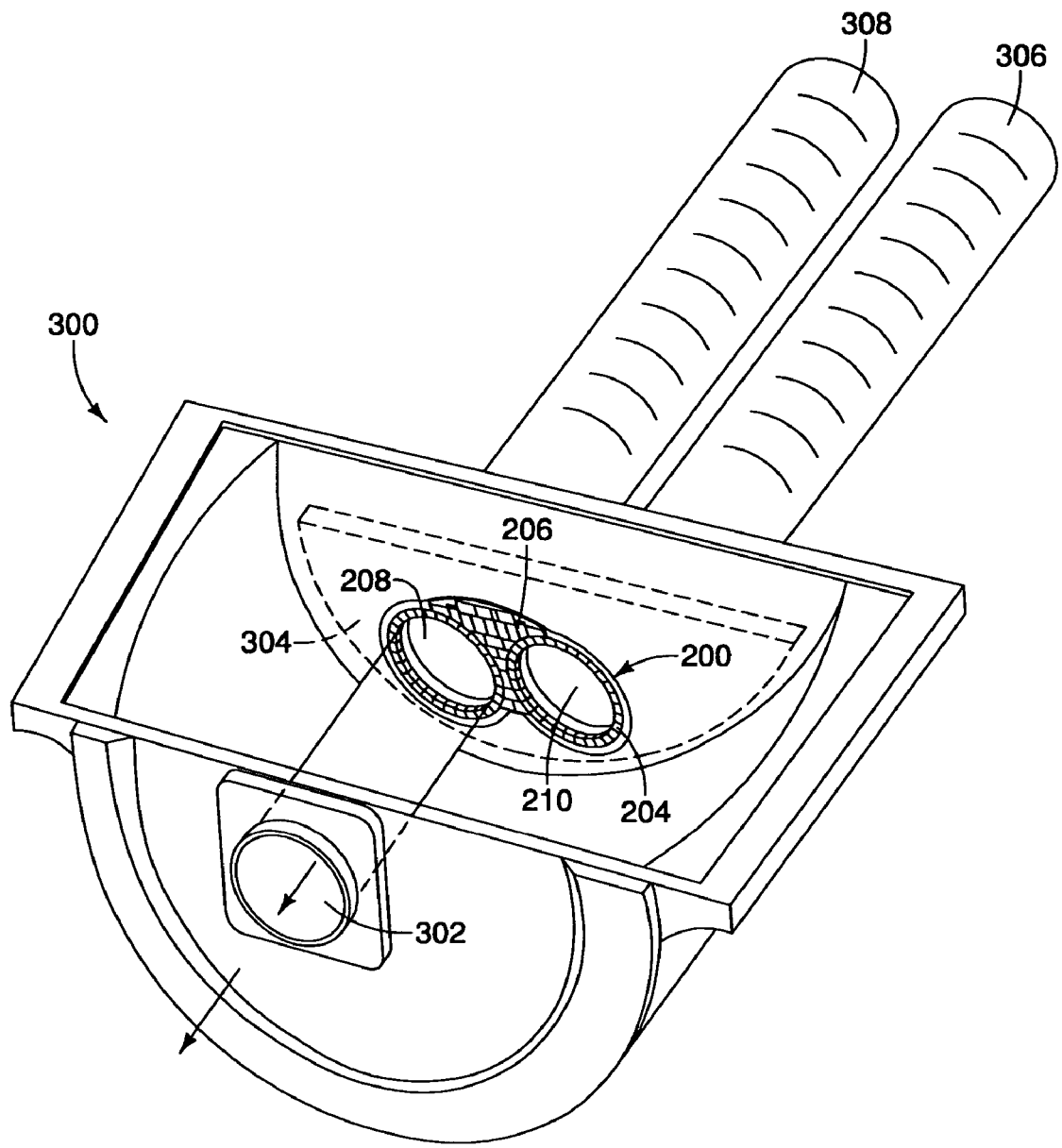
FIG. 5 is an isometric view of a multi-cylinder abrasive slurry pump utilizing a wear plate in accordance with a preferred embodiment of the present invention.
Figure 6:
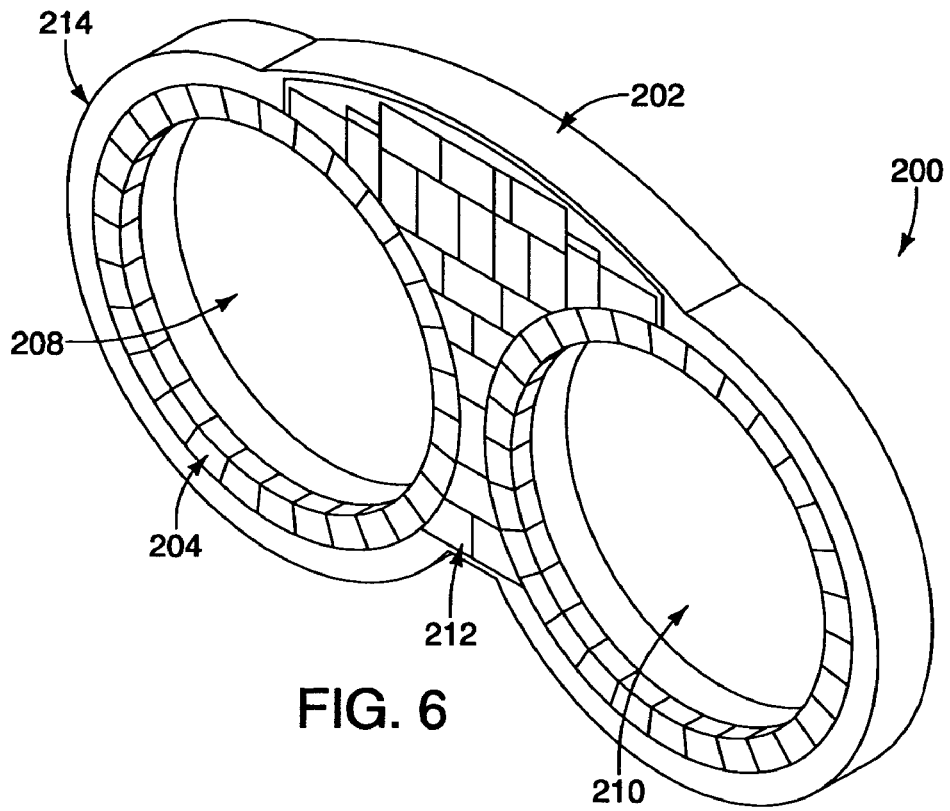
FIG. 6 is an isometric view of a wear plate of FIG. 5.
Figure 7:
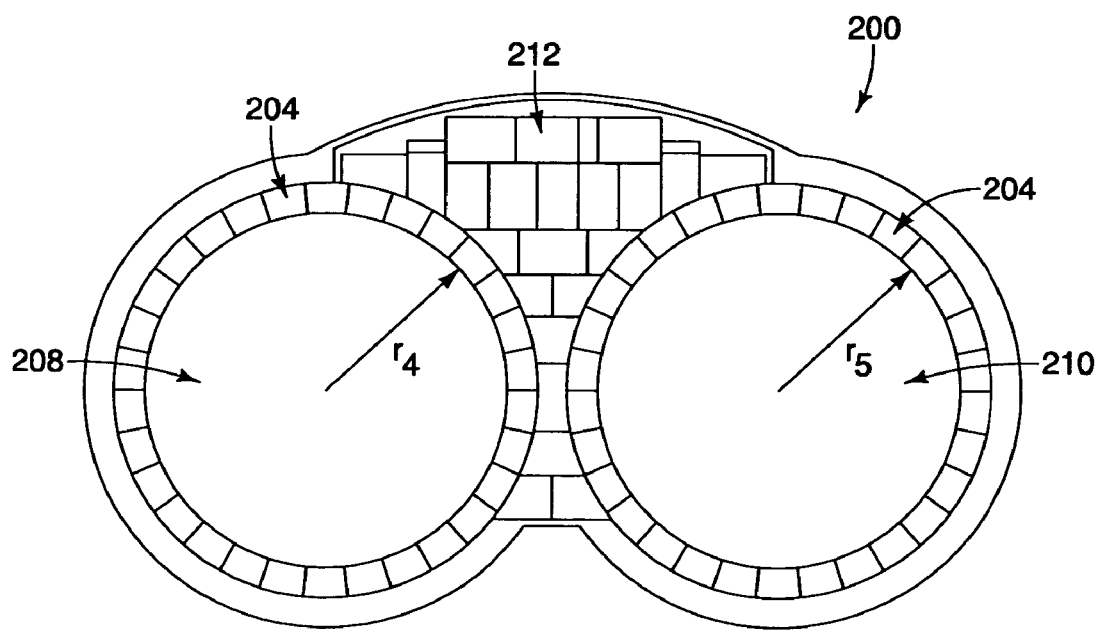
FIG. 7 is a front view of the wear plate of FIG. 5.

Alternatively, in another preferred embodiment of the present invention, a pair of cylinders can be fitted with a single wear plate 200, as can be seen in FIGS. 5-7. In many cases, a pair or multiple pairs of cylinders are utilized. In these cases, not only are the wear rings subject to wear from the abrasive slurry, but intermediate plate surfaces may be subject to wear as well.

Turning to FIGS. 5-7 of the drawings, a multi-cylinder pump 300 employs wear plate 200, which is in accordance with a preferred embodiment of the present invention where the wear plate 200 comprises a core base plate 202, ring tiles 204, and intermediate tiles 206.

Specifically, the pump 300 includes a pivot pipe 302 and a cylinder plate 304. The cylinder plate 304 enables the pivot pipe 302 to move between supply pipes 306 and 308. However, because of the problems associated with abrasion resulting from fluid contact with the concrete or other abrasive slurry, wear plate 200 is included on the face of the cylinder plate 304 while a wear ring 100 is provided on the end of the pivot pipe 302. In other words, both the ring tiles 204 and the intermediate tiles 206 face in the direction of the pivot pipe 302. Thus, a hard wear surface is provided where there is a poor seal between the pivot pipe 302 and supply pipes 306 and 308 and where there is frictional contact with the pivot pipe 302.

Underlying the wear plate 200 is the core base plate 202. The core base plate 202 includes two wear rings: first wear ring 208 and second wear ring 210. Between the first wear ring 208 and the second wear ring 210 is the intermediate plate surface 212. Typically, the core base plate 202 is comprised of a soft material, such as steel, that includes an inherent flexibility. Specifically, a material used for the core base plate 202 is chosen based on its fracture toughness, which is typically greater than 30 MPa-m$^{1/2}$ at standard temperature and pressure.

Secured to the front face 214 of the core base plate 202 are hard tiles. In particular, each of the first wear ring 208 and the second wear ring 210 have inner radii $r_4$ and $r_5$, respectively. Secured along the inner radii $r_4$ and $r_5$ of the first wear ring 208 and the second wear ring 210 are ring tiles 204, which form a nearly uniform surface along the circumference of the inner radii $r_4$ and $r_5$. Without additional coverage by other tiles, intermediate plate surface 212 remains exposed, but intermediate tiles 206 are secured to the front face 214 of the core base plate 202 on the intermediate plate surface 212 to provide the additional coverage. Thus, most of the front face 214 of the core base plate 202 is covered by hard tiles.

The hard material that comprises the ring tiles 204 and the intermediate tiles 206 is, typically, tungsten carbide, tantalum carbide, as well as other hard metals, carbides, and ceramics. Due to the increased hardness, there is less emphasis on a need for a material with a relatively high fracture toughness. In fact, a material employed for the tiles can be chosen to have a fracture toughness of less than 10 MPa-m$^{1/2}$. However, the ring tiles 204 are softer relative to the intermediate tiles 206. Specifically, the ring tiles 204 have a hardness from about HRA 70 to HRA 90 while the intermediate tiles 206 have a hardness of about HRA 80 to about HRA 95. The ring tiles 204, themselves, are less effective at providing a seal than the intermediate tiles 206, but are of sufficient softness to better resist fracturing that results from shearing abrasive slurries. Moreover, these tiles 204 and 206 are typically secured into place by gluing, brazing, soldering, or welding.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A pipe seal for an abrasive materials pump, comprising:
a core base ring formed of a first material selected for strength and fracture toughness, the base ring having a first side and an opposing second side and having at least one aperture extending from the first side to the second side;
a plurality of tiles of a first size formed of a second material secured to the base core ring along a radial surface of the aperture;
a plurality of tiles of a second size formed of a third material and secured to the first side of the base core ring at a first radial distance from the center of the aperture;
a plurality of tiles of additional sizes formed of a fourth material and secured to the first side of the base core ring at a second radial distance from the center of the aperture;
wherein the fourth material is harder than the first material;
wherein the second material is harder than the fourth material; and
wherein the third material is harder than the second material.

2. The pipe seal of claim 1, wherein the plurality of tiles of a first size is arranged to extend from the first side.

3. The pipe seal of claim 1, wherein the plurality of tiles of a second size is arranged to extend to the aperture.

4. The pipe seal of claim 1, wherein the plurality of tiles of a first size, the plurality of tiles of a second size, and the plurality of tiles of additional sizes are secured to the core base ring by soldering, welding, brazing, or gluing.

5. A pump assembly for moving abrasive slurries, the pump assembly comprising:
a pair of slurry conduits, each conduit having a circular opening;
a transfer conduit having a circular opening, the opening of the transfer conduit being movable between the openings of each of the pair of conduits to establish fluid communication between one of the slurry conduits and the transfer conduit;
a seal ring associated with at least one of the openings in the slurry and transfer conduits, the seal ring including:
a core base ring formed of a first material selected for strength and fracture toughness, the base ring having a first side and an opposing second side and having at least one aperture extending from the first side to the second side;

a plurality of tiles of a first size formed of a second material secured to the base core ring along a radial surface of the aperture;

a plurality of tiles of a second size formed of a third material and secured to the first side of the base core ring at a first radial distance from the center of the aperture;

a plurality of tiles of additional sizes formed of a fourth material and secured to the first side of the base core ring at a second radial distance from the center of the aperture;

wherein the fourth material is harder than the first material;

wherein the second material is harder than the fourth material; and wherein the third material is harder than the second material.

6. The pump assembly of claim 5, wherein the plurality of tiles of a first size is arranged to extend from the first side.

7. The pump assembly of claim 5, wherein the plurality of tiles of a second size is arranged to extend to the aperture.

8. The pump assembly of claim 5, wherein the plurality of tiles of a first size, the plurality of tiles of a second size, and the plurality of tiles of additional sizes are secured to the core base ring by brazing.

9. A seal for an abrasive slurry pump assembly, comprising:

a core base plate formed of a first material selected for strength and fracture toughness having a front side and a rear side, the core plate having two or more ring shaped apertures of at least one selected inner diameter therein which extend from the front side to the rear side;

a plurality of first tiles formed of a second material arranged around each inner diameter of each of the ring shaped apertures;

a plurality of second tiles formed of a third material arranged to at least partially covering the front side;

wherein the second material is harder than the first material; and wherein the third material is harder than the second material.

* * * * *